United States Patent [19]
Imai

[11] 3,916,097
[45] Oct. 28, 1975

[54] TELEVISION CAMERA DEVICE FOR WATCHING PURPOSE

[75] Inventor: Yoshihisa Imai, Kokubunji, Japan

[73] Assignee: Copal Company Limited, Tokyo, Japan

[22] Filed: May 21, 1974

[21] Appl. No.: 472,211

[30] Foreign Application Priority Data

May 28, 1973 Japan ................................ 48-62552
Mar. 18, 1974 Japan ................................ 49-30968

[52] U.S. Cl. ..... 178/7.2; 178/DIG. 1; 178/DIG. 30; 178/DIG. 38
[51] Int. Cl.$^2$ ........................ H04N 5/26; H04N 7/18
[58] Field of Search ................. 178/DIG. 1, DIG. 30, DIG. 38, 178/7.2

[56] References Cited

UNITED STATES PATENTS 3,819,856 6/1974 Pearl ................................ 178/7.81

*Primary Examiner*—Robert L. Griffin
*Assistant Examiner*—Edward L. Coles
*Attorney, Agent, or Firm*—Oblon, Fisher, Spivak, McClelland & Maier

[57] ABSTRACT

Television camera device for watching purpose comprising a casing housing therein a television camera for hiding the camera from the exterior of the casing while the desired sight exterior of the casing is viewed by the camera. The camera is rotatably supported by a supporting post in a space to be watched and reciprocally rotated by a motor in the casing through a control device therefor or through a reciprocating link mechanism.

2 Claims, 8 Drawing Figures

TELEVISION CAMERA DEVICE FOR WATCHING PURPOSE

BACKGROUND OF THE INVENTION

The present invention relates to a television camera device for watching purpose, and more particularly to a television camera device suitable for watching a space such as the show room in a shop.

Heretofore, an industrial watching television camera device has been known which is stationarily secured to a suitable position in the working area and wherein an image receiving device connected to the camera is located remote from the camera so that a predetermined sight in the working area can be watched by the television camera. In such a case, the range of the sight is limited and, when a standard picture taking lens is used in the camera, disadvantages arise in that only a small range of distance in the sight can be watched.

In order to avoid the above described disadvantages, a television camera device has been proposed which is provided with a separate reciprocally rotatable device on which the television camera is mounted so that a wide range of the sight can be viewed by the camera. In such a case, however, since the camera is made discrete from the reciprocally rotatable device, the movement of the camera is conspicuous so that it is inappropriate for watching the show room, for example, for preventing robbery or other troubles, because the provision of such a television camera might afford to good customers bad impression.

The present invention aims at avoiding the above described disadvantages of the prior art television camera device for watching purpose.

SUMMARY OF THE INVENTION

The object of the present invention is to provide a novel and useful television camera device for watching purpose which avoids the disadvantages of the prior art television camera device as described above.

The above object is achieved in accordance with the present invention by the provision of a television camera device comprising a casing mounted on a support post in a space to be watched by the television camera device, at least a portion of the casing being rotatable with respect to the supporting post and reciprocally rotated by an electric motor through control means or a reciprocating mechanism, and a television camera mounted in the above at least one portion of the casing rotatable with respect to the supporting post so that the camera is hidden from the exterior of the casing while the wide range of sight in the space can be viewed by the camera.

By the construction of the television camera device of the present invention, the customers are not aware of the provision of the television camera device so that no bad impression is given to the customers while exact watching of the space to be watched by the television camera device is achieved without fail.

DETAILED DESCRIPTION OF THE PREFERRED EMBODIMENTS

Figure 1:
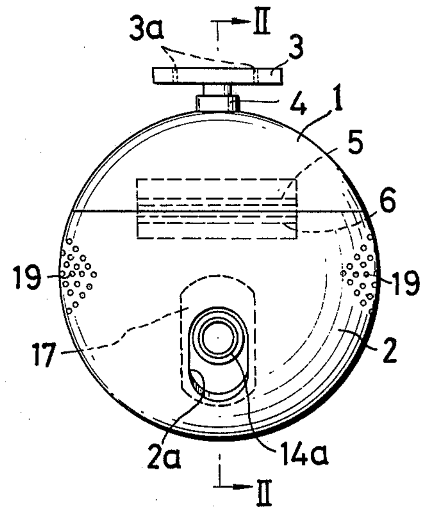
FIG. 1 is an elevational view showing a first embodiment of the television camera device constructed in accordance with the present invention.
Figure 2:
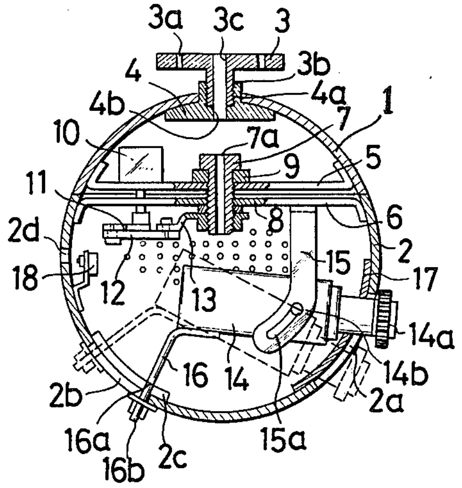
FIG. 2 is a sectional view along line II—II in FIG. 1.

Referring to FIGS. 1 and 2 showing the first embodiment of the present invention, the casing of the television camera device of the present invention comprises a first upper portion 1 and a second lower portion 2 forming in combination a spherical configuration.

The first portion 1 is fixedly secured to the supporting member 4 which is in turn secured to a supporting post 3 having a mounting flange adapted to be fixed to a stationary portion in a space to be watched by the television camera device of the present invention by set screws passing through holes 3*a*. Central through holes 3*c* and 4*b* are formed through the supporting post 3 and the supporting member 4, respectively.

The upper portion 1 is provided with an upper chasis plate 5 secured to the open end edge of the upper portion 1 while a lower chasis plate 6 is secured to the open end edge of the lower portion 2 mating with the open end edge of the upper portion 1.

A pivot shaft 7 having a central through hole 7*a* extends from the upper chasis plate 5 to the lower chasis plate 6 through central holes formed centrally thereof with a thrust bearing 9 interposed between the enlarged head portion of the shaft 7 and the upper chasis plate 5 thereby permitting the shaft 7 to be rotatably supported by the upper chasis plate 5.

Figure 3:
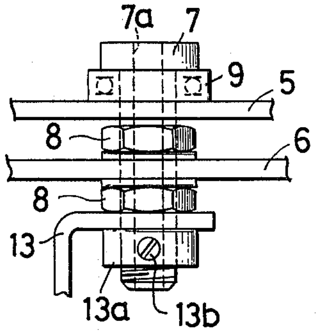
FIG. 3 is a fragmentary elevational view showing the arrangement of the pivot shaft employed in the embodiment of FIG. 2.

As shown in FIG. 3, the lower chasis plate 6 is fixedly secured to the shaft 7 by means of a pair of nuts 8 threadedly engaging with the threaded portion of the shaft 7 and a follower plate 13 is fixedly secured with its proximal end to the lower end of the shaft 7 by means of a collar 13*a* threadedly secured to the lower end of the shaft 7 and fastened thereto by means of set screw 13*b*. Thus, the lower chasis plate 6, the lower portion 2 of the casing and the follower plate 13 are rotatable about the axis of the shaft 7 together with the shaft 7 with respect to the upper portion 1 of the casing which is fixedly secured to the supporting post 3.

An electric motor 10 is mounted on the upper chasis plate 5 and the shaft of the motor 10 extends through a hole in the upper chasis plate 5 and an elongated arcuate hole formed in the lower chasis plate 6 into the lower portion 2 of the casing.

One end of a driving plate 11 is fixedly secured to the lower end of the shaft of the motor 10 and the other end of the plate 11 is pivotally connected to one end of a connecting plate 12 the other end of which is pivotally connected to the other end of the follower plate 13 thus forming a link mechanism by the driving plate 11, the connecting plate 12 and the follower plate 13 interconnecting the shaft of the motor 10 and the pivot shaft 7 thereby permitting the lower portion 2 of the casing to be reciprocally rotated about the shaft 7 while the motor 10 is continuously driven.

A bifurcated bracket 15 having a pair of arcuate elongated holes 15*a* is secured to the lower side of the lower chasis plate 6 by means of set screws (not shown), for example, and a pair of pins 14*b* secured to the opposite sides of a television camera 14 are slidably received in the elongated arcuate holes 15*a* respectively.

A bracket 16 having shoulder portion 16*a* near the outer end thereof and formed with a threaded portion 16*b* at the outer end thereof is fixedly secured at its proximal end to the rear bottom side of the camera 14 as shown in FIG. 2.

The threaded portion 16*b* of the bracket 16 extends through an elongated hole 2*b* formed in the wall of the lower portion 2 of the casing and a pair of guide plates 2*c* are located at opposite sides of the threaded portion 16*b* along the elongated hole 2*b* on the inner surface of the lower portion 2 so that the shoulder portion 16*a* of the bracket 16 is adapted to abut against the guide plates 2*c* when a nut threadedly engaging with the threaded portion 16*b* is fastened, thereby permitting the television camera 14 to be adjustably secured by virtue of the sliding engagement of the pins 14*b* with the elongated holes 15*a* of the bifurcated bracket 15.

The picture taking lens 14*a* of the television camera 14 extends through an elongated hole 2*a* formed in the lower portion 2 of the casing and a hiding cover 17 is provided around the lens 14*a* which slides along the inner surface of the lower portion 2 around the elongated hole 2*a* so that the interior of the lower portion 2 is prevented from being viewed from the exterior.

Ventilating holes 19 are formed in the wall of the casing as shown.

An exterior electric source and remote control means for controlling the operation of the motor 10 are connected to the motor 10 through lead wires (not shown) which extend from the motor 10 through the holes 7*a*, 4*b* and 3*c* to the electric source. Alternatively the electric source and the remote control means can be located in the casing.

Figure 4:
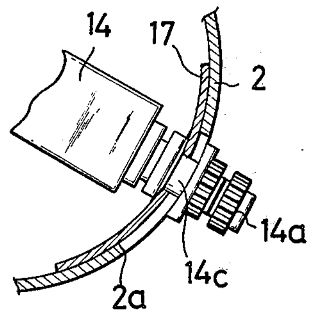
FIG. 4 is a fragmentary side view partly in section showing an alternative mounting of the television camera in the casing shown in FIG. 2.

FIG. 4 shows an alternative adjustable mounting of the television camera 14 in the casing.

As seen in FIG. 4, a fastening threaded member is provided around the mounting portion 14*c* of the lens 14*a* so that the lens 14*a* is adjustably fixedly secured to the wall portion of the casing through the elongated hole 2*a* while the position of the television camera 14 can be adjusted by loosening the nut on the threaded portion 16*b* of the bracket and again fastening it after adjustment of the position of the camera 14, thus permitting the optical axis of the lens 14*b* to be adjusted so as to view the desired sight in the space to be watched.

An adjusting means 18 is secured to the inner surface of the lower portion 2 of the casing which is actuatable from the exterior of the casing through a hole 2*d* formed in the wall of the casing in alignment with the adjusting means thereby permitting the focusing of the television camera and the B-voltage to be adjusted around the elongated opening 2*a* by fastening the threaded member. In this case, the supporting bracket 15 and the bracket 16 are dispensed with.

In operation, when the motor 10 is energized by the electric source through the remote control means, the shaft of the motor 10 is rotated so that the driving plate 11 rotates. The rotation of the driving plate 11 causes the reciprocal rotation of the follower plate 13 through the connecting plate 12. Since the follower plate 13 is fixedly secured to the pivot shaft 7 which is in turn fixedly secured to the lower chasis plate 6, the lower portion 2 of the casing is reciprocally rotated together with the television camera 14 so that a predetermined range of sight defined by the angular rotation of the casing is repeatedly viewed by the television camera 14. The direction of the optical axis of the lens 14*a* may be adjusted as described above for directing the lens 14*a* to the desired sight in the space to be watched.

The speed of the motor 10 may be adjusted by the remote control means, or the operation of the motor may be controlled manually.

The supporting post is shown as being located above the casing. However, the position of the post may be inverted so as to support the casing from the lower side thereof. The angular stroke of the casing may be changed by appropriately changing the size of the plates 11, 12 and 13.

The link mechanism comprising the plates 11, 12 and 13 may also be replaced by appropriate gearing mechanism.

The lens 14*a* is shown as being projected out of the casing. However, the lens 14*a* may be located within the casing and the light from the sight is received by the lens 14*a* through the opening 2*a* in which appropriate filter means may be provided so as to hide the interior of the casing from the exterior thereof while the sight is viewed by the lens 14*a* through the filter means.

The length of the supporting post 3 may be made adjustable so as to locate the casing at the desired height for watching purpose.

Figure 5:
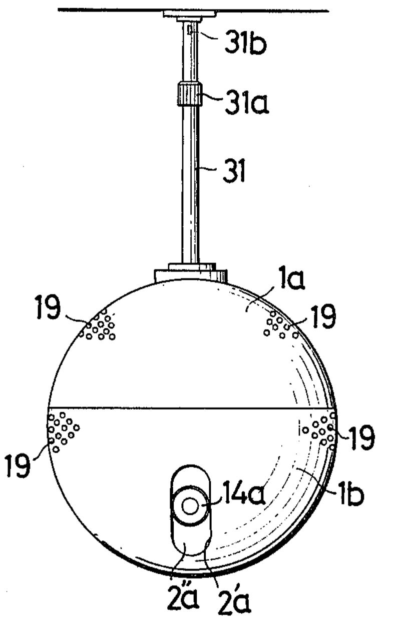
FIG. 5 is an elevational view showing a second embodiment of the present invention.
Figure 6:
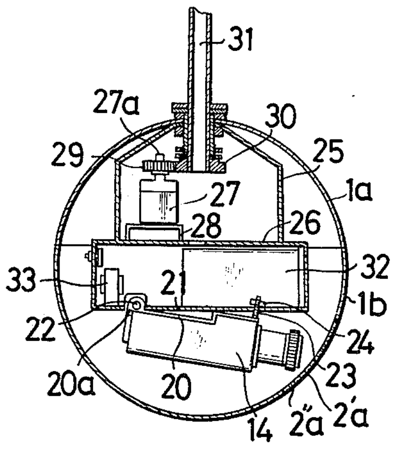
FIG. 6 is a sectional view similar to FIG. 2 but showing the internal construction of the second embodiment shown in FIG. 5.

FIGS. 5 and 6 show the second embodiment of the present invention.

In the embodiment shown in FIGS. 5 and 6, the upper portion 1*a* and the lower portion 1*b* of the casing are integrally joined to each other as shown and the casing is rotatably mounted on the supporting post 31 having a length adjusting means 31*a*.

Figure 7:
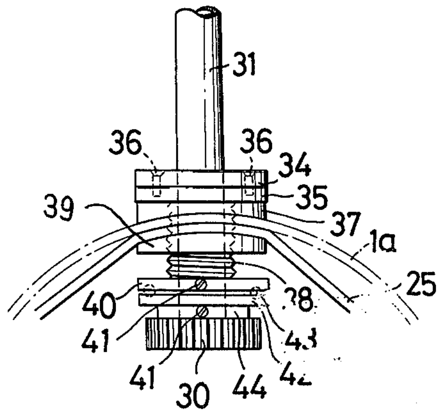
FIG. 7 is a fragmentary elevational view showing the rotational mounting of the casing of the embodiment of FIG. 6 on the supporting post.

An example of the rotational mounting of the casing on the post 31 is shown in FIG. 7.

A collar 34 is integrally formed in or fixedly secured to the post 31 and a collar 35 is fixedly secured to the collar 34 around the post 31 by set scres 36.

A member 37 having an upper end surface slidingly engaging with the lower end surface of the collar 35 is threadedly secured to the threaded cylindrical member 38 which is rotatably fitted on the post 31. The member 37 has a lower end surface conforming with the configuration of the outer surface of the portion of the upper portion 1a of the casing around the post 31, and the wall portion of the upper portion 1*a* around the threaded cylindrical member 38 and an upper wall portion of a frame member 25 around the threaded cylindrical member 38 are tightly clamped between the member 37 and a member 39 threadedly engaged with the thread of the member 38 so that the upper portion 1*a* of the casing and the frame member 25 and the members 37 and 39 are rotated together with the threaded cylindrical member 38 around the supporting post 31.

In order to prevent the threaded cylindrical member 38 from falling out of the post 31, an upper bearing race member 40 is fixedly secured to the lower end of the threaded cylindrical member 38 by means of a set screw 41 and a lower bearing race member 42 is fitted around the post 31 and supported by a boss 44 of a gear 30 fitted around the lower end of the post and fixedly secured thereto by a set screw 41. Bearing balls 43 are interposed between the upper and lower race members 40, 42, thus forming a thrust ball bearing assembly by the upper and lower race members 40, 42 and the balls 43. Therefore, the upper portion 1*a* of the casing and the frame member 25 are rotated around the post 31 together with the threaded member 38 by the provision of the ball bearing assembly, while the gear 30 is held stationarily with respect to the post 31.

As seen in FIG. 6, the frame member 25 is provided with a base plate 26 on which a motor supporting bracket 28 is mounted. The bracket 28 is provided with an elongated hole (not shown) through which set screws (not shown) are passed so that a reversible motor 27 is adjustably secured by the set screws at appropriate position to the bracket 28. A gear 29 is provided on the shaft of the motor 27 which is engaged with the gear 30 secured to the post 31 so that the casing and the frame member 25 are rotated around the post 31 when the motor 27 is energized through the engagement of the gears 29, 30.

A bottom plate 21 is secured to the base plate 26 therebeneath so that two stage construction is formed by the frame member 25, the base plate 26 and the bottom plate 21.

A control circuit board 32 and a transformer 33 are mounted on the bottom plate 21 at appropriate positions for balancing the weight of the casing, and they are connected to the motor 27 through lead wires (not shown) thereby controlling the actuation of the motor 10 as described later.

An exterior electric source and a remote control means may be connected to the control circuit board 32 through lead wires extending through the opening 31*b* formed in the post 31 into the casing, the operation of which will be described later.

As shown in FIG. 6, a television camera 14 is provided in the casing. The camera 14 is secured to a frame plate 20, and the plate 20 is provided at its rear end (with respect to the location of the camer 14) with a pair of upstanding ears 20*a* having holes, respectively, into which a pair of pins 22 secured to the bottom plate 21 are engaged thereby permitting the plate 20 to be swung together with camera 14 around the pins 22, while an adjusting thread 23 is secured to the forward end which extends through a hole formed in the bottom plate 24. An adjusting nut 24 is engaged with the thread 23 so that the inclination of the camera 14 can be adjusted by manipulating the nut 24 thereby permitting the lens 14*a* of the camera 14 to be directed to the desired direction for viewing the desired sight.

An elongated opening 2'*a* is formed in the casing at a position so that the picture taking lens 14*a* of the camera 14 is permitted to receive light from the scene in the space to be watched through the opening 2'*a*.

In order to prevent the camera 14 from being viewed from the exterior of the casing or to hide the camera from the exterior of the casing while the lens 14*a* is permitted to receive sufficient light from the scene for watching purpose, an appropriate filter plate 2''*a* is arranged in the opening 2'*a*.

Figure 8:
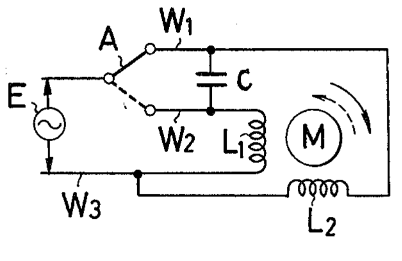
FIG. 8 is a wiring diagram showing an example of the electric circuit of the control means incorporated in the embodiment of FIG. 6.

FIG. 8 shows an example of the construction of the motor, the control circuit board and the remote control means utilizable in the embodiment of FIG. 6.

In FIG. 8, the motor which can be referred to as a capacitor starting inductor type motor and which can be used as the motor 27 comprises a rotor M and a first armature coil $L_1$ and a second armature coil $L_2$ arranged as shown in FIG. 8.

One terminal of an A.C. external electirc source E is connected to a movable contact A which is switchable between a first contact connected to the lead wire $W_1$ and a second contact connected to the lead wire $W_2$, the movable contact A and the first and second contacts connected to the lead wires $W_1$, $W_2$, respectively, forming the remote control means located outside of the television camera device and adapted to be manually operated or automatically operated by a suitable timing means (not shown) for switching the contacts.

One end of the coil $L_1$ is connected to the lead wire $W_2$ and one end of the coil $L_2$ is connected to the lead wire $W_1$, while the other end each of the coils $L_1$, $L_2$ is connected together to the lead wire $W_3$ which is connected to the other end of the electric source E.

A capacitor C is connected across the one end of the coil $L_1$ and the one end of the coil $L_2$ as shown, the capacitor C constituting the control circuit board 32 and lead wires $W_1$, $W_2$ and $W_3$ extending from the casing of the television camera device outside thereof through the post 31 and the opening 31*b* to the remote control means and the electric source E. Thus, when the movable contact A is switched to be connected to the first contact leading to the wire $W_1$, the phase of the coil $L_2$ is advanced by 90° with respect to that of the coil $L_1$, and vice versa.

By the construction of the remote control means, the control circuit board 32 and the motor 27 as described above, the direction of rotation of the motor 27 is reversed by switching the remote control means, thereby permitting the casing to be reciprocally rotated together with the television camera 14 therein so that the desired range of sight in the space to be watched can be viewed by the camera 14 as in the case of the first embodiment shown in FIGS. 1 and 2.

Alternatively, the control circuit board 32 may include automatic switching means in place of the exterior remote control means described above, thus permitting the direction of the rotation of the motor 27 to be automatically reversed to achieve the desired reciprocal rotation of the casing.

The control circuit board 32 may further include speed adjusting means of the motor 27.

Or, the remote control means may include speed adjusting means of the motor 27 so that the follow-up of the object to be watched is facilitated in addition to the reversing of the rotation of the motor 27 effected by the remote control means.

The gears 29, 30 may be spur gears, helical gears or other type of gears insofar as they can transmit rotation from one to the other.

The gears 29, 30 may further be replaced by other motion transmitting means such as that shown in FIG. 2. In this case, the switching means for reversing the rotation of the motor 27 may be dispensed with.

The shaft of the motor 27 may be directly connected to the post 31 by using a suitable adapter, and the same effect is achieved by such a construction.

As in the case of FIG. 2, the post 31 may be located beneath the casing so as to support the same from the lower side of the casing.

The casing serves not only to hide the television camera, but also to render the casing to be decorative by appropriately treating the outer surface of the casing, so that the device can be more advantageously used as the watching television camera device.

I claim:

1. Television camera device for watching purpose comprising a casing supported by a supporting post in position in a space to be watched by said television camera device, said casing consisting of a first portion fixedly secured to said supporting post and a second portion rotatably mounted on said first portion by a pivot shaft secured to said second portion and extending into said first portion so as to be rotated with respect to said first portion, a television camera mounted in said second portion of said casing with its picture taking lens directed to the desired direction in said space through an opening formed in said second portion thereby permitting said camera to be operated to watch the desired sight in said space while it is hidden in said second portion, an electric motor mounted in said casing and energized by an electric source, motion transmitting means located in said second portion of said casing and interconnecting said electric motor and said pivot shaft secured to said second portion of said casing thereby permitting said pivot shaft and, hence, said second portion of said casing to be rotated with respect to said first portion of said casing by the actuation of said electric motor wherein said motion transmitting means comprises a driving plate with its proximal end secured to the shaft of said electric motor, a connecting plate with its one end pivotally connected to the distal end of said driving plate and a follower plate with its proximal end secured to said pivot shaft while the distal end thereof is pivotally connected to the opposite end of said connecting plate, thereby permitting said second portion of said casing to be reciprocally rotated together with said television camera while said electric motor is continuously driven.

2. Television camera device for watching purpose comprising a casing rotatably supported by a supporting post in position in a space to be watched by said television camera device, said post extending into said casing for rotatably supporting the same, a television camera mounted in said casing with its picture taking lens directed to the desired direction in said space through an opening formed in said casing thereby permitting said camera to be operated to watch the desired sight in said space while it is hidden in said casing, an electric motor mounted in said casing and energized by an electric source, control means connected to said electric motor for controlling the actuation of said motor, motion transmitting means located in said casing and interconnecting said electric motor and said supporting post thereby permitting said casing to be rotated by the actuation of said electric motor wherein said motion transmitting means comprises a first gear secured to the shaft of said electric motor and a second gear secured to a portion of said supporting post extending into said casing and engaging with said first gear thereby permitting said casing to be rotated by the actuation of said electric motor.

* * * * *